(12) United States Patent
Taylor

(10) Patent No.: US 6,490,598 B1
(45) Date of Patent: Dec. 3, 2002

(54) SYSTEM AND METHOD FOR EXTERNAL BACKUP AND RESTORE FOR A COMPUTER DATA STORAGE SYSTEM

(75) Inventor: Kenneth J. Taylor, Franklin, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/466,976

(22) Filed: Dec. 20, 1999

(51) Int. Cl.[7] .............................................. G06F 17/30
(52) U.S. Cl. ........................ 707/204; 707/202; 345/356
(58) Field of Search ................................ 707/202, 204; 345/356

(56) References Cited

U.S. PATENT DOCUMENTS

| | | | | |
|---|---|---|---|---|
| 6,047,294 | A | * 4/2000 | Deshayes et al. | 707/204 |
| 6,092,086 | A | * 7/2000 | Martin et al. | 707/202 |
| 6,199,074 | B1 | * 3/2001 | Kern et al. | 707/204 |
| 6,329,985 | B1 | * 12/2001 | Tamer et al. | 345/356 |
| 2002/0002661 | A1 | * 1/2002 | Blumenau et al. | 711/165 |

OTHER PUBLICATIONS

"Integration of EMC TimeFinder and SRDF Software Within Informix Dynamic Server,"p/n AB51815, Engineering White Paper, EMC Corporation, Dec. 12, 2000.*

*EMC Data Manager Product Description Guide*, 1999, Chapter 4, EDM Symmetrix Connect and EDM Symmetrix Path, pp. 23–31.

* cited by examiner

*Primary Examiner*—Charles L. Rones
(74) *Attorney, Agent, or Firm*—Brian L. Michaelis; David D. Lowry; Brown Rudnick Berlack Israels LLP

(57) ABSTRACT

A system providing intelligent, integrated external backup and restore for databases and DBMS (data base management systems) which are stored on data storage systems. An interface between the data storage system backup system and the DBMS allows the backup system to work with the DBMS for greatly enhanced backup and restore. External backup and restore frees up the host systems from having to pipeline the data from the data storage system to the backup system. The backup system is able to determine which files stored in the data storage system should be backed up, based on querying the DBMS. This invention is useful for systems including RAID data storage system storing databases (including relational and object oriented), and provides for partial as well as complete backup and restore options.

8 Claims, 4 Drawing Sheets

SYSTEM AND METHOD FOR EXTERNAL BACKUP AND RESTORE FOR A COMPUTER DATA STORAGE SYSTEM

FIELD OF THE INVENTION

This invention is directed towards data storage systems, and more particularly towards physical backup and restore of databases residing in data storage systems.

BACKGROUND

Computer systems allow the processing of massive quantities of data for a variety of purposes. As the ability to process data has increased, so has the need for data storage systems which provide massive data storage capabilities combined with fast access for host systems. Another feature required by many businesses and industries is continuous availability. Many businesses operate on a world-wide basis, and have a need for round-the-clock access to databases stored in one or more data storage systems. The data stored in these data storage systems is changing at an incredible rate, for example with transaction processing, reservation systems and data mining, the data is changing and updating many times per second.

Another requirement for data storage systems is periodic backup of data both for archival purposes and for data recovery in case of a system failure. For many businesses, a loss of data can be catastrophic. Therefore, system backups must be performed on a frequent basis.

However, the need for system backups often interferes with the need for continuous availability. With many data storage systems, performing a system backup requires taking the data storage system offline, thereby denying continuous access to the data.

One solution to this problem is used for RAID (Redundant Array of Independent Disks) systems. In RAID-1 systems, two physical storage devices, such as disks, each store identical data, in a process known as "mirroring". This provides a very high level of fault tolerance in the form of redundancy, and it also allows data backups to be performed while still allowing continuous data access. Typically, the mirroring process is stopped (referred to as splitting the mirrors), and one of the disks is taken off-line and backed up, while the other disk remains online and available. When the first is completely backed up, the two are resynchronized (so that the data is identical on both), and the data storage system returns to full operation.

However, there are still problems related to backing up at the physical disk volume level, instead of at the application level. For example, a database (whether hierarchical, relational, object-oriented or otherwise) stores data in a logical structure which does not match physical disk details. Several layers of mapping are performed to map the database data onto the physical disks. Modem data storage systems perform mapping of physical disks to logical volumes, to support a standard representation of storage units to host systems. These logical volumes appear to host systems as a defined set of storage volumes for the host to access. The data storage systems perform all functions of converting logical volume addressing and accessing to functions effective on physical disks.

But there is still one layer of mapping (or more) from the database application to logical volumes. The database application performs much of this mapping function, to provide the host systems with access to the database data in a format dictated by the database application. The host systems benefit from having all the mapping details performed automatically by the database applications and the data storage systems. However, the layers of mapping make the process of backup and restore much more difficult. Traditional backup systems are unable to back up the variety of data formats and client platforms that exist in heterogeneous, growing networks, leaving potential holes in network backup coverage and leaving administration decentralized. There is little integration of the backup systems to allow "intelligent" backups by taking advantage of the mapping layers, for example to perform incremental backups. Often, the only solution is for "brute force" complete database space backups, which are inefficient and time consuming. This causes a great discrepancy between the advantages which many database applications provide to host systems. Ultimately, there is significant difficulty in performing timely data storage system backups as necessary to prevent catastrophic data loss.

Some presently available database applications have a non-integrated approach for external backup of mirrored database spaces. This approach blocks the data storage system server, allowing only read-only accesses to run, therefore it is only usable for a mirrored data storage system as previously described. Further, this approach requires blocking the data storage system server for the length of time necessary to split mirrors. Also, the user must manually perform logical restore to successfully restore their spaces. These non-integrated approaches essentially involve making the DBMS accept on faith that the user has done a physical restore. There is great risk in depending on the users to perform all backup/restore procedures correctly.

SUMMARY

The present invention provides for intelligent, integrated external backup and restore for DBMS which is stored on RAID data storage systems.

According to the present invention, an interface between the data storage system backup system and the DBMS allows the backup system to work with the DBMS for greatly enhanced backup and restore. External backups can be created by blocking the server after forcing a checkpoint, whereupon the backup is created using an external resource. In one embodiment, this is accomplished by disconnecting the mirrored target data from the source online data, so that the target data can be saved to a safer site other than the production site. After the backup is created, the server is unblocked to resume normal server operations.

An example of a relational database is the Informix 7.3 database and database management system (DBMS) from Informix Software Inc. of Menlo Park, Calif. The Informix DBMS runs on several Unix platforms as well as Microsoft Windows®. The Informix DBMS provides very limited access to other applications attempting to perform system utility operations such as backup/restore. An illustrative embodiment of the present invention provides for external backup/restore of Informix 7.3 database spaces and blob spaces, through an interface to the Informix OnLine server.

During an unplanned event such as a data center disaster, fast restores can be performed from the external backups. In an external backup, the SMV (Storage Management Vendor) is completely responsible for issuing all I/O commands to move the data from disk to tape. In a normal DBMS managed backup, the database vendor issues the I/O command to read the data from disk, and the SMV then writes the data to tape. Conversely, in an external restore, the SMV issues all I/O commands from the tape back to disk. A DBMS managed restore has the SMV reading the data from tape, and the DBMS then writing the data to the disk. In both cases, data is restored from tape, and the roll forward (if required) with logical logs may occur.

According to an illustrative embodiment of the present invention, there are two different types of external restore supported: complete external restore and partial external restore. In a complete external restore, all spaces will be restored to the most recent checkpoint that was generated while creating an external backup. A complete external restore is usually necessary when a major portion of the data storage system server needs to be restored or if an application error corrupts data. If users lose only a portion of the data (which is more typically the case), a partial external restore may be performed. A partial external restore restores only a subset of spaces that are down. This subset of spaces is defined by the user, with the limitation that it does not include any critical database spaces.

After a complete external restore, the user can optionally do a logical restore to bring the server to logical consistency. A point-in-time restore can also be done as part of a complete external restore, to roll forward the logs to a specific time.

According to an illustrative embodiment of the present invention the external backup is implemented by interfacing to the DBMS backup application to support querying, blocking, and unblocking the server (from access by the host systems). The physical external restore is done by the SMV software. The user then performs the logical restore by using extensions to the DBMS backup application.

Advantages of the present invention include an external backup and restore mechanisms for a DBMS, such as Informix, where the mechanisms are effectively integrated with the DBMS. Other advantages include the seamless integration of external backup/restore procedures between the DBMS and the Storage Management Vendor (SMV). This invention automates the manual, and error prone external backup/restore procedures offered by the DBMS vendor.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
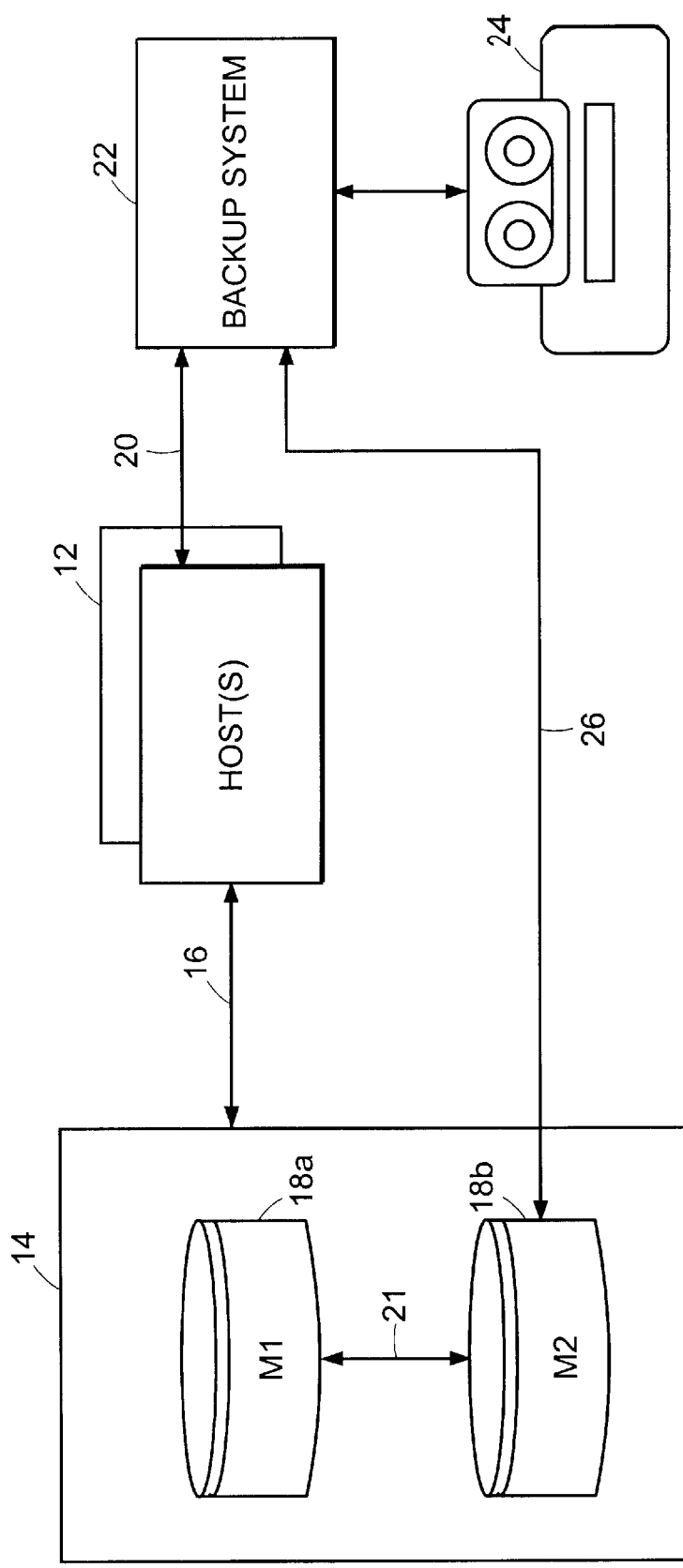
FIG. 1 is a block diagram of a data storage system including backup components according to the prior art.

An overview of major components of data system 10 is shown in FIG. 1. One or more host computer systems 12 access, process and store data from a data storage system 14. The host systems 12 are interfaced to the data storage system 14 over an interface 16, which may be any of various types of interface such as a Fibre or SCSI interface. The host systems 12 are also interfaced 20 to a backup system 22, which provides data backup and restore to appropriate storage devices 24, for example via tape storage. This interface 20 between the host systems 12 and the backup system 22 is also any of various types of interface, such as a TCP/IP connection.

The data storage system 14 is any of various types of mass data storage systems, including for example a RAID system with multiple disks. A RAID-1 system is illustrated, with two mirrored disk volumes (mirrors) 18a, 18b. The mirrors 18a, 18b are connected 21 such that the data is replicated on both mirrors 18. Although the mirrors 18 are illustrated in a same data storage system 14 enclosure, the mirrors can be physically remote from each other, but still support RAID-1 mirroring using a remote data facility option, including a high-speed connection 21 such as an ESCON® fibre link connection.

For backup and restore of data stored on the data storage system 14, a standard method for backup requires the host systems 12 to extract the data from the databases on the data storage system 14 and pipe the data over to the backup management system 22. This method is incredibly slow, and it requires tying up host systems 12 time in the form of database access operations and data pipelining. A better solution is known as "direct connect". A high speed direct connection 26 is provided between the data storage system 14 and the backup management system 22, thereby allowing fast pipelining of data directly to the backup management system 22, without the need for host system 12 intervention. This high speed direct connection 26 can be over any of various types of interfaces, such as a SCSI connection.

An example data storage system 14 is the Symmetrix mass storage system provided by EMC Corporation of Hopkinton, Massachusetts. An example backup management system 22 is the EMC Data Manager (EDM). EDM can support backup and restore via three different methods, each tailored to particular backup environments and needs. The same EDM can support three different backup methods simultaneously.

EDM runs a backup manager known as EDM Symmetrix Connect. EDM Symmetrix Connect is optimized for very large database (VLDB) environments, providing extremely high performance backup where the data movement between media (typically between disk and tape) is completely offloaded from the host systems 12 and the network. EDM exploits direct I/O capabilities to offer backup rates of hundreds of gigabytes per hour backup performance. Additionally, EDM offers high availability, using duplicate production volumes, either local or remote to run nondisruptive, point-in-time backups, and provides for non-disruptive backup for UNIX and Windows NT. This enables host systems 12 and users to stay operational and continue access to the data storage system 14 while backup occurs.

EDM also supports a direct connection 26 from the EDM backup client and the data storage system 14 to the EDM system via an optimized path 26, offering a fast NT backup solution, while completely offloading the network 16 from the backup data stream. EDM supports large Oracle, Sybase, Informix or MS SQL Server databases on popular UNIX and NT platforms. EDM supports backup of data storage system-resident or local-disk-resident information using the data storage system and the server to move the backup data over Ultra SCSI and Fibre Channel connections from disk to tape at very high speeds. The control data/handshaking is done over the network 16 while the backup data is moved over network alternative data storage system channels 26.

The data storage system 14 includes at least one database application, which is accessed by the host systems 12 through the fast interface 16. Backup of the database application over the high speed connection 26 avoids requiring host system 12 intervention, however the advantage of the host system's interface to the database is lost. For example, with an Oracle database on the data storage system 14, the ability to use the host system's logical mapping to the database is not possible. A solution to this problem is presented in U.S. Pat. No. 6,047,294, issued Apr. 4, 2000, which is incorporated herein by reference.

Figure 2:
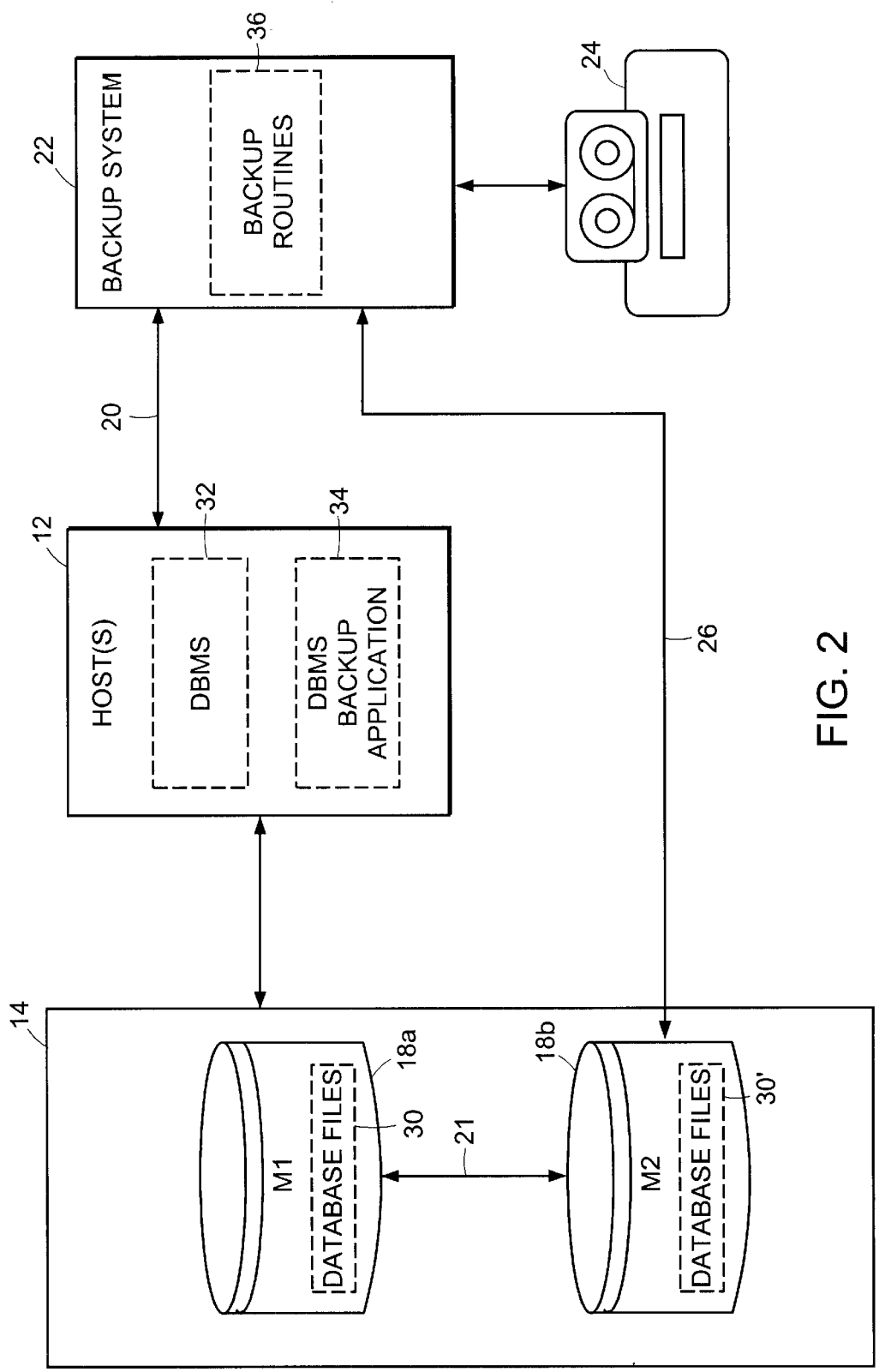
FIG. 2 is a block diagram showing the present invention integrated into the data storage system of FIG. 1.

The present invention is directed towards using the backup system 22 FIG. 2 to perform external backup and restore of database spaces 30 in the data storage system 14 by interfacing to the DBMS backup application 34 provided by the database vendor. The database files are stored in database spaces 30 in the data storage system 14, and are accessed by the host systems 12 through the DBMS 32 running on the host systems 12. The backup system 22 controls the external backup/restore. It interfaces to the DBMS backup application 34 for querying information about the database spaces 30, and for issuing commands to the DBMS backup application 34 for controlling the database spaces 30, such as blocking and unblocking host system access to the database spaces 30. The backup system 22 interfaces with the DBMS backup application 34 through the connection 20, but performs external backup/restore over the high speed direct connection 26. The logs are backed up by having the DBMS Backup Application 34 read the log files 30 and send the data over the interface 20 to the backup system 22 which then writes them to the tape media 24.

An illustrative embodiment of the present invention provides an interface from an EMC EDM backup system 32 to an Informix DBMS. The Informix DBMS backup application 34 is the Informix Server which includes commands used for discovery, block and unblock. The illustrative embodiment also provides details of interfacing the EMC EDM backup system 32 to any vendor's DBMS backup application 34.

Figure 3A:
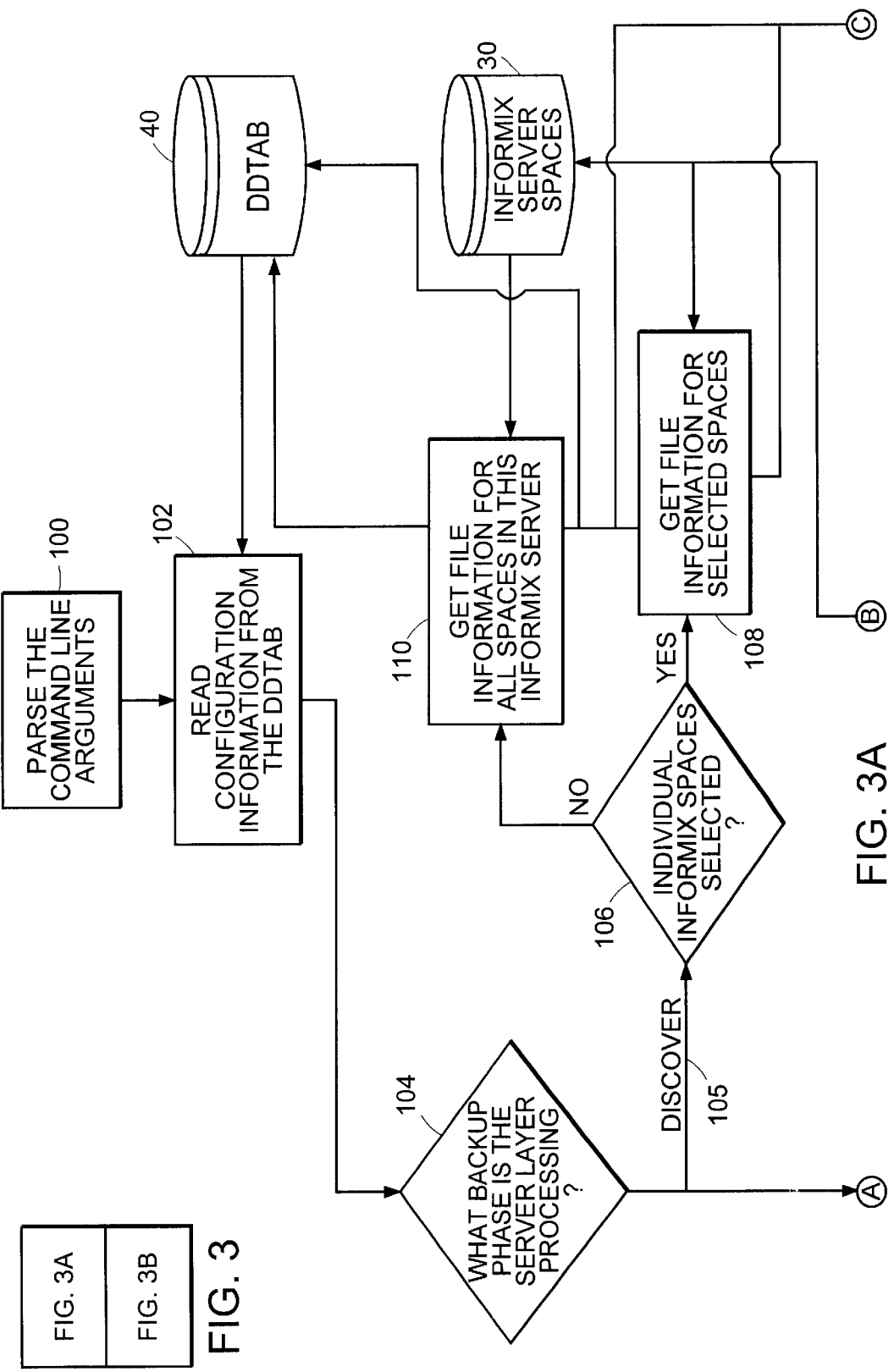
FIG. 3 is a flow chart of the data backup procedure according to an illustrative embodiment of the present invention.
Figure 3B:
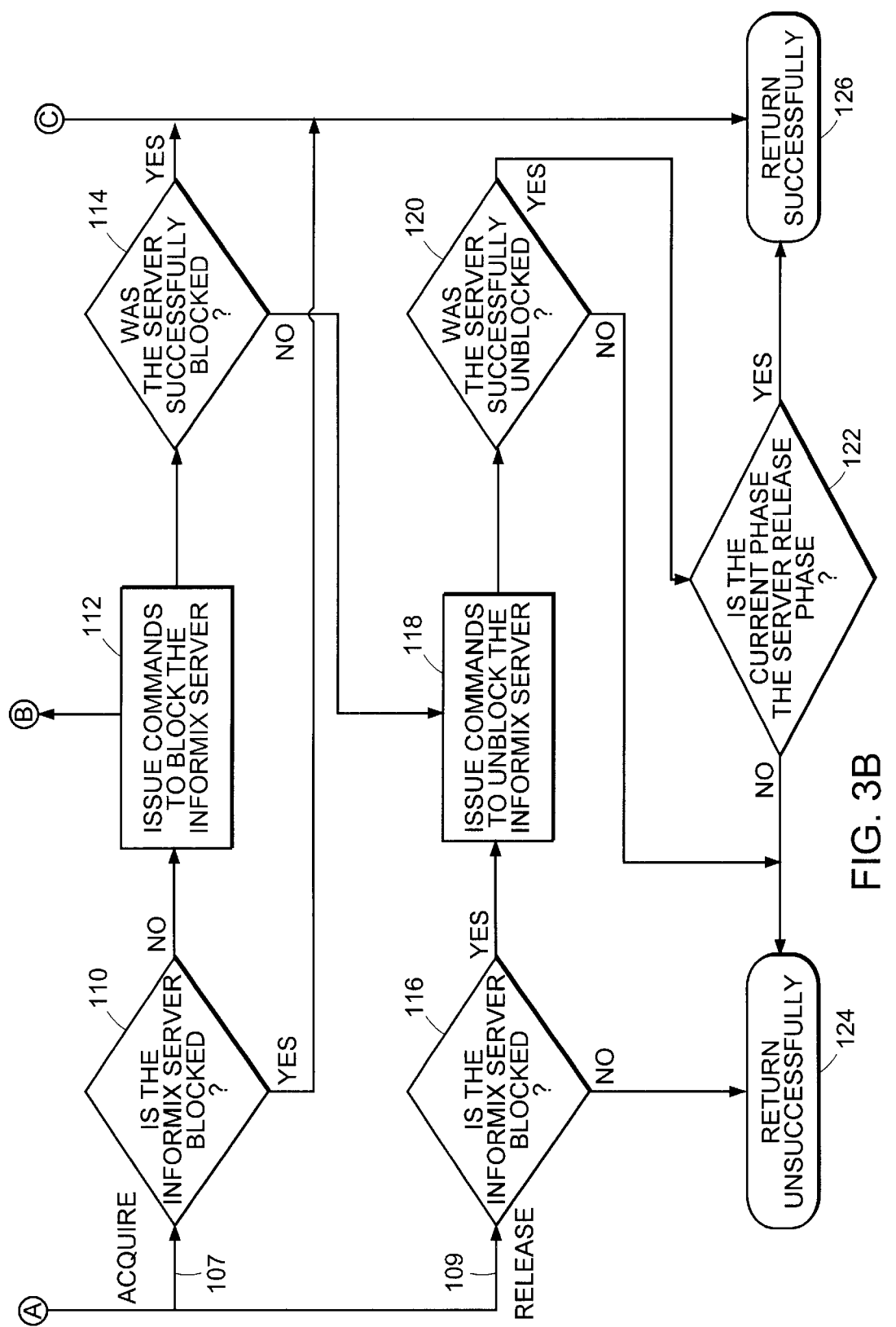

The steps performed by the illustrative embodiment of the present invention are shown with. reference to FIG. 3. A backup process running on the backup system 32 commences with parsing any command line arguments provided, step 100. Next the system reads the configuration from the discovery data table (DDTAB) 40, step 102. The DDTAB is typically copied to the database host 12 FIG. 2 for Discovery, Acquire and Release. The next step performed 104 FIG. 3 depends on the particular backup phase, which includes Discover, Acquire, or Release. The particular backup phase is identified from the command line as parsed in step.

A Discovery phase 105 is used to determine what components of a database are to be backed up (for example, a complete database backup of all files, or only selected files such as the files required for a backup of tables spaces). If individual table spaces are selected (through the command line), step 106, then the backup system 32 gets the file information for the selected spaces, step 108. Spaces typically consist of multiple "chunks". These chunks describe a logical storage location on disk 30, FIG. 2. This storage location is the lowest level understanding of storage that the database application has. This information is stored in the DDTAB 40. The backup system uses this information in later phases of the discovery process to map this logical storage onto the exact physical storage locations on the disk 30 FIG. 2. When the appropriate application level files have been identified, a corresponding entry is made in the DDTAB 40.

If all spaces have been selected at step 106 (a complete backup), then the system gets file information for all spaces in the server spaces 30, step 110. Corresponding entries are made in the DDTAB 40.

Once the DDTAB 40 is properly. updated, the Discover phase returns successfully, step 126.

The Acquire stage 107 is performed to block the DBMS server (32), thereby allowing the mirror-splitting process to take place. Steps 100–104 are again performed, which includes the system reading the configuration information from the DDTAB 40, which will indicate which spaces need to be backed up, as previously determined in the Discovery phase 105. The Acquire stage continues with the system checking to see if the DBMS server is blocked, step 110. If the DBMS server is already blocked then Acquire stage returns successfully, step 126.

If the DBMS server is not already blocked, the system issues the commands to block the DBMS server, step 112. The system then checks to determine if the DBMS server was successfully blocked, step 114. A variety of DBMS error conditions might cause the block to be unsuccessful, for example a disk media failure can cause the flushing of data from cache memory to disk to fail, thereby making the block fail. If it was successfully blocked, then the Acquire stage returns successfully, step 126.

However, if the attempt to block the DMBS server was not successful at step 114, the system then proceeds to issue commands to unblock the DBMS server 42, step 118. This is done prophylactically to ensure that the backup process never leaves the server in a persistently blocked state.

The system then checks to see if the DBMS server was successfully unblocked, step 120. If the DBMS server was not successfully unblocked, then the Acquire stage returns unsuccessfully (returns with indications that the stage was unsuccessful), step 124. If the DBMS server was successfully unblocked at step 120, the Acquire stage still returns unsuccessfully at step 124, since the Acquire stage did not block the DBMS server 42, as required for the Acquire stage, (as indicated by step 122).

Once the DBMS server is blocked, The EDM may acquire the disk resource (FIG. 2 14) by splitting mirrors. Once the mirrors have been split, system backup through Symmetrix connect occurs. The DDTAB file 40 is sent to the backup Symmetrix connect system. The DDTAB file 40 is used to determine what physical storage segments in the data storage system need to be backed up. Backup may take the form of first splitting the mirrors 18a, 18b and backing up the off-line mirror 18b. Similarly, the disks may be controlled and backed up as described in U.S. patent application Ser. No. 09/502,208 corresponding, entitled "System and Method for Backing Up Data Stored in a Mass Storage Subsystem Under Control of a Backup Server", filed on Mar. 31, 1998 which is incorporated herein by reference.

When the all Acquire steps are complete, the Release stage is performed. Again Steps 100–104 are performed, which includes the system reading the configuration information from the DDTAB 40, which will indicate which spaces have been backed up and now need to be unblocked. The Release stage 109 next checks to see if the DBMS server is presently blocked, step 116. If the DBMS server is not presently blocked, then the Release stage returns unsuccessfully, step 124. If the server is not blocked at release time, it means that the mirror devices 30' FIG. 2 are not guaranteed to be suitable for backup. The server must be blocked at the time of the disk acquire phase. In illustrative embodiment, the database is released back to the user after the mirrors have been split, but before the actual backup to tape. The illustrative embodiment can therefore detect this invalid condition before the movement of data begins, and fail the backup very early in the process.

Otherwise, the system then proceeds to issue commands to unblock the DBMS server 42, step 118. The system then checks to see if the DBMS server was successfully unblocked, step 120. If the DBMS server was not successfully unblocked, then the Release stage returns unsuccessfully, step 124. If the DBMS server was successfully unblocked at step 120, the Release stage then returns successfully at step 126.

Logs are not required for a full external restore, since a full external restore is consistent. Logs are required, however, for a partial external restore. It is required that the physically restored data be logically restored to make the server consistent. The user uses the standard vendor-specific DBMS backup utility functionality to ensure that logs are backed up. Typically, automatic backup log alarm archiving (to tape) is turned on. It is possible that any attempts by Symmetrix connect to affect the logs would interfere with this.

The database layer code can be abstracted, so that Informix specific code can exist in its own module. This reduces the chances of regressions being introduced. In order to avoid introducing Informix specific code to the non-database layer Symmetrix connect code, dummy files and other constructs are utilized. For example, non-database layer code creates DO_FILE_LISTs for Oracle temporary control files, backs them up, and deletes them from disk. The Informix DBMS does not have this requirement. By having the Informix database layer create a dummy file for inclusion in the DDTAB, it is possible to avoid introducing Informix specific code. This type of approach also works for Oracle 8 Proxy Copy, and other DBMS implementations.

For the illustrative embodiment interfaced to an Informix DBMS to support external backup/restore, the following modules are used with Symmetrix Connect. Some modules are the same or similar to the external backup/restore interface for Oracle DBMS as described in the referenced application.

eb_dc_db_itf: returns the database interface type. Some example return values include Oracle, Informix, SAP/R3, Backint Interface (this implies Oracle is the database), and MS SQLServer. The present invention will work with any new database interface type which are developed. This function calls the DBMS or proxy specific interface layers. In the illustrative embodiment, the database type would be read from the DDTAB as "informix", and eb_dc_inf_itf is then invoked.

eb_dc_inf_itf: This module has the Informix specific database interface code. The database interface layer uses eb_exec_as to execute Informix commands. For Unix systems, this allows the root user on the database machine to run commands as the Informix User.

The new operative command for Informix Discovery is:

select* a.name,b.fname from sysdbspaces a,syschunks b where a.dbsnum=b.dbsnum onstat -d may all be used in some circumstances, as well as consulting the ONCONFIG configuration file.

The operative command for Informix preparation is: onmode-c block

The operative command for Informix release is: onmode-c unblock eb_dc_config: configuration module, that now is sensitive to the database type, and modified to handle the different terms used by Informix for backup objects. For example, Informix DBMS uses terms such as Server name, dbspace and blobspace. As interfaces to other DBMS implementations may be added, the implementation specific config components can optimally be changed to function calls that are sourced in, based on the database type.

eb_dc_restore: restoration module, similar to eb_dc_config is modified to handle interfaces to other DBMS implementations.

The modules discussed here are the ones that are changed or be added within the current Symmetrix Connect product according to the illustrative embodiment. They do not represent a complete list of all modules that are invoked to run a backup or restore. Further, another embodiment involves changing the core Symmetrix Connect product such that configuration (eb_dc_config) is all be done via the EDM GUI (Graphic User Interface) application.

Although the invention has been shown and described with respect to illustrative embodiments thereof, various other changes, omissions and additions in the form and detail thereof may be made therein without departing from the spirit and scope of the invention.

What is claimed is:

1. A method for backing up data stored in data storage system, said data controlled by a DBMS (data base management system) running on a host computer connected to said data storage system, said method comprising:

interfacing to said DBMS for said data;

querying said DBMS regarding said data, to determine files to be backed up;

commanding said DBMS to block access to said data by said host computer;

performing a backup of said files to be backed up without using said DBMS;

commanding said DBMS to unblock access to said data by said host computer.

2. The method of claim 1 further including:

after said step of commanding said DBMS to block access to said data by said host computer, checking with said DBMS to confirm access to said data has been blocked.

3. The method of claim 1 further including:

after said step of commanding said DBMS to unblock access to said data by said host computer, checking with said DBMS to confirm access to said data has been unblocked.

4. The method of claim 1 wherein said DBMS is an Informix database.

5. A method for backing up data stored in data storage system, said data controlled by a DBMS (data base management system) running on a host computer connected to said data storage system, said method comprising:

interfacing to said DBMS for said data;

querying said DBMS regarding said data, to determine files to be backed up;

commanding said DBMS to block access to said data by said host computer;

performing a backup of said files to be backed up without using said DBMS;

commanding said DBMS to unblock access to said data by said host computer;

wherein said data storage system includes a RAID-1 data storage system with mirrored storage devices, and said step of performing a backup includes splitting apart said mirrored storage devices.

6. The method of claim 5 wherein said step of performing a backup includes after splitting apart said mirrored storage device, commanding said DBMS to unblock access to said data by said host computer, and performing a backup on an offline mirror of said mirrored storage devices.

7. A system for backing up data stored in data storage system, said data controlled by a DBMS (data base management system) running on a host computer connected to said data storage system, said method comprising:

a backup system, including at least one backup storage device, and in communication with said host computer and also in communication with said data storage system, wherein said backup system performs the steps of:
      interfacing to said DBMS running on said host computer;
      querying said DBMS regarding said data, to determine files to be backed up from said data storage system;
      commanding said DBMS to block access to said data by said host computer;
      performing a backup of said files to be backed up to said at least one backup storage device, without using said DBMS;
      commanding said DBMS to unblock access to said data by said host computer.

8. A system for backing up data stored in data storage system, said data controlled by a DBMS (data base management system) running on a host computer connected to said data storage system, said method comprising:

a backup system, including at least one backup storage device, and in communication with said host computer and also in communication with said data storage system, wherein said backup system performs the steps of:
      interfacing to said DBMS running on said host computer;
      querying said DBMS regarding said data, to determine files to be backed up from said data storage system;
      commanding said DBMS to block access to said data by said host computer;
      performing a backup of said files to be backed up to said at least one backup storage device, without using said DBMS;
      commanding said DBMS to unblock access to said data by said host computer;
      wherein said data storage system includes a RAID-1 data storage system with mirrored storage devices, and said backup system splits apart said mirrored storage devices, host system, and performing a backup on an offline mirror of said mirrored storage device.

* * * * *